(12) United States Patent
Zhong et al.

(10) Patent No.: US 10,346,437 B1
(45) Date of Patent: Jul. 9, 2019

(54) EVENT TRIGGERED DATA COLLECTION

(71) Applicant: EMC IP Holding Company LLC, Hopkinton, MA (US)

(72) Inventors: Xin Zhong, Beijing (CN); Brian R. Tetreault, Upton, MA (US); Wai Yim, Merrimack, NH (US); Yongmei Xie, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 333 days.

(21) Appl. No.: 14/307,710

(22) Filed: Jun. 18, 2014

(51) Int. Cl.
*G06F 16/28* (2019.01)
(52) U.S. Cl.
CPC .................................. *G06F 16/285* (2019.01)
(58) Field of Classification Search
CPC ...................................................... G06F 16/285
See application file for complete search history.

(56) References Cited

U.S. PATENT DOCUMENTS

| | | | | |
|---|---|---|---|---|
| 5,768,500 A * | 6/1998 | Agrawal | ............... | G06F 11/348 714/47.2 |
| 6,363,411 B1 * | 3/2002 | Dugan | .............. | H04M 3/42136 379/201.01 |
| 2006/0161816 A1 * | 7/2006 | Gula | ...................... | H04L 41/065 714/39 |
| 2007/0043974 A1 * | 2/2007 | LeBlanc | ............. | G06F 11/2268 714/23 |
| 2009/0207749 A1 * | 8/2009 | Roskowski | ......... | H04L 41/0681 370/252 |

* cited by examiner

*Primary Examiner* — Van H Oberly
(74) *Attorney, Agent, or Firm* — Muirhead and Saturnelli, LLC (57) ABSTRACT

Described are techniques for processing event occurrence. A first notification may be received regarding a first occurrence of a first event. Responsive to receiving the first notification, first processing may be performed that includes mapping the first event to a first profile, and performing second processing using the first profile to collect first data regarding the first occurrence of the first event.

20 Claims, 9 Drawing Sheets

160

Mapping information 170

| Events 172 | Profiles 174 |
|---|---|
| 180 — LUN Offline ⋮ | LUN Offline Profile ⋮ — 180a |
| 190 — ⋮ All replication events | ⋮ Replication Profile — 190a |
| All data cache events | Cache Profile — 190b |
| All data deduplication events | Deduplication Profile — 190c |
| All data storage optimizer events | Data storage optimization profile — 190d |
| All snapshot events ⋮ | Snapshot profile ⋮ — 190e |
| 195 — All other events | Default profile |

| Mapping information 170 | |
|---|---|
| Events 172 | Profiles 174 |
| LUN Offline ... | LUN Offline Profile — 180a ... |
| All replication events | Replication Profile — 190a |
| All data cache events | Cache Profile — 190b |
| All data deduplication events | Deduplication Profile — 190c |
| All data storage optimizer events | Data storage optimization profile — 190d |
| All snapshot events ... | Snapshot profile — 190e ... |
| All other events | Default profile |

180 — LUN Offline row
190 — middle group
195 — All other events / Default profile

| |
|---|
| General Section 410 |
| 410a — Name = Replication Profile |
| 410b — Timeout = 30 minutes |
| 410c — Size Threshold = 10 M |
| Files Section 412 |
| 412a — /EMC/C4Core/log/c4_safe_ktrace.*   #Datapath logs for replication functionality |
| 412b — /EMC/CEM/log/cemtracer.*   #Provisioning logs for replication functionality |
| 412c — /nas/log/nas_log.*   #Provisioning logs for replication functionality |
| 412d — /var/log/messages*   #Linux OS system logs |
| Commands Section 414 |
| 414a — uemcli /prot/rep/session show –detail   #Dump all replication status in the system |
| 414b — uemcli -sslPolicy accept /remote/sys show –detail   #Dump all remote systems connected with this system |

| | |
|---|---|
| General Section 510 | |
| 510a — Name = MCC Profile<br>510b — Timeout = 30 minutes<br>510c — Size Threshold =10 M | |
| Files Section 512 | |
| 512a — EMC/C4Core/log/c4_safe_ktrace.* #MCC runtime log, used to analyze cache related issues<br>512b — /var/log/messages* #Linux OS system logs, used to analyze system event sequences | |
| Commands Section 514 | |
| 514a — Psmtool get KDB_SPCache_Config1 mcc_configuration #Dump MCC configuration in the system<br>514b — Fbecli.exe < flu.cfg  #dump FLU status in the system. MCC have dependency on lower level LUN objects so check their status before deciding this is an MCC issue<br>514c — Fbecli.exe <mcc.cfg  #dump MCC in-memory status, such dirty cache status and other run-time statistics.<br>514d — Fbecli.exe <mcc.cfg  #dump status of hard disks/physical devices in the system | |

EVENT TRIGGERED DATA COLLECTION

BACKGROUND

Technical Field

This application relates to techniques used in connection with data collection, and in particular, to event triggered data collection.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

SUMMARY OF THE INVENTION

In accordance with one aspect of the invention is a method for processing event occurrences comprising: receiving a first notification regarding a first occurrence of a first event; and responsive to receiving the first notification, performing first processing including: mapping the first event to a first profile; and performing second processing using the first profile to collect first data regarding the first occurrence of the first event. The step of mapping may further include selecting the first profile from a plurality of predefined profiles, wherein each of said plurality of predefined profiles is mapped to any of a single event and a logical grouping of multiple events. The plurality of predefined profiles may include at least one profile mapped to a defined logical grouping of multiple events and at least one profile mapped to a single event. Each of the plurality of predefined profiles may include a first section of general information, the first section comprising one or more thresholds specifying constraints enforced when performing second processing using the first profile to collect the first data. The one or more thresholds may include a time threshold identifying a maximum allowable amount of time to perform said second processing to collect the first data. The one or more thresholds may include a size threshold identifying a maximum allowable size of the first data collected as a result of performing said second processing. Each of the plurality of predefined profiles may include a second section identifying one or more files included in the first data collected, said one or more files including any of a system log file, a system configuration file, a component trace, and runtime data. Each of the plurality of predefined profiles may include a third section identifying one or more commands executed in said second processing to collect the first data. The third section may include a first command inline in the first profile and wherein the third section may also identify a script including one or more additional commands, said first command and the script being executed in said second processing to collect the first data. The at least one profile mapped to multiple events may be for a data storage system component. The data storage system component may be any of a hardware component, a software component, a data replication facility, a data storage optimizer, a snapshot facility, a global data cache, and a data deduplication facility. The first profile may identify one or more commands executed in the second processing that perform customized data collection for the first event. The method may be performed in a data storage system for data storage system related events and the first data may include diagnostic information related to any of a system log file, data storage system configuration information, a component trace, and runtime data.

In accordance with another aspect of the invention is non-transitory computer readable medium comprising code stored thereon that, when executed, performs a method that processes event occurrences comprising: receiving a first notification regarding a first occurrence of a first event; and responsive to receiving the first notification, performing first processing including: mapping the first event to a first profile; and performing second processing using the first profile to collect first data regarding the first occurrence of the first event. The mapping may further include selecting the first profile from a plurality of predefined profiles, wherein each of said plurality of predefined profiles is mapped to any of a single event and a logical grouping of multiple events. The plurality of predefined profiles may include at least one profile mapped to a defined logical grouping of multiple events and at least one profile mapped to a single event. Each of the plurality of predefined profiles may include a first section of general information, the first section comprising one or more thresholds specifying constraints enforced when performing second processing using the first profile to collect the first data. Each of the plurality of predefined profiles may include a second section identifying one or more files included in the first data collected, said one or more files including any of a system log file, a system configuration file, a component trace, and runtime data. Each of the plurality of predefined profiles may include a third section identifying one or more commands executed in said second processing to collect the first data.

In accordance with another aspect of the invention is a data storage system comprising: one or more processors; and a memory comprising code stored therein that, when executed by a first of said one or more processors, performs a method that processes event occurrences in the data storage system, the method comprising: receiving a first notification regarding a first occurrence of a first event in the data storage system; and responsive to receiving the first notification, performing first processing including: mapping the first event to a first profile; and performing second processing using the first profile to collect first data regarding the first occurrence of the first event.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
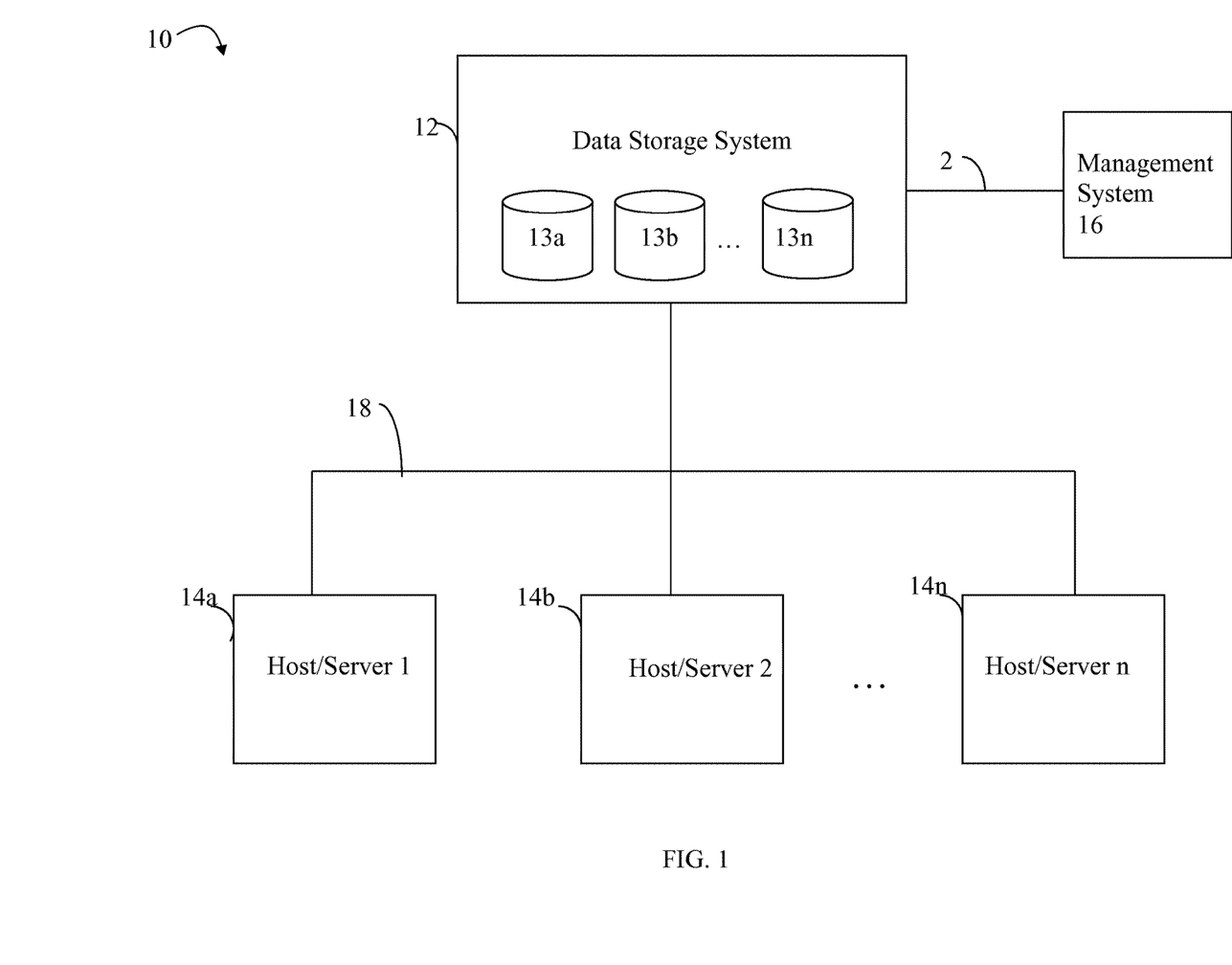
FIGS. 1 and 2 are examples of embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
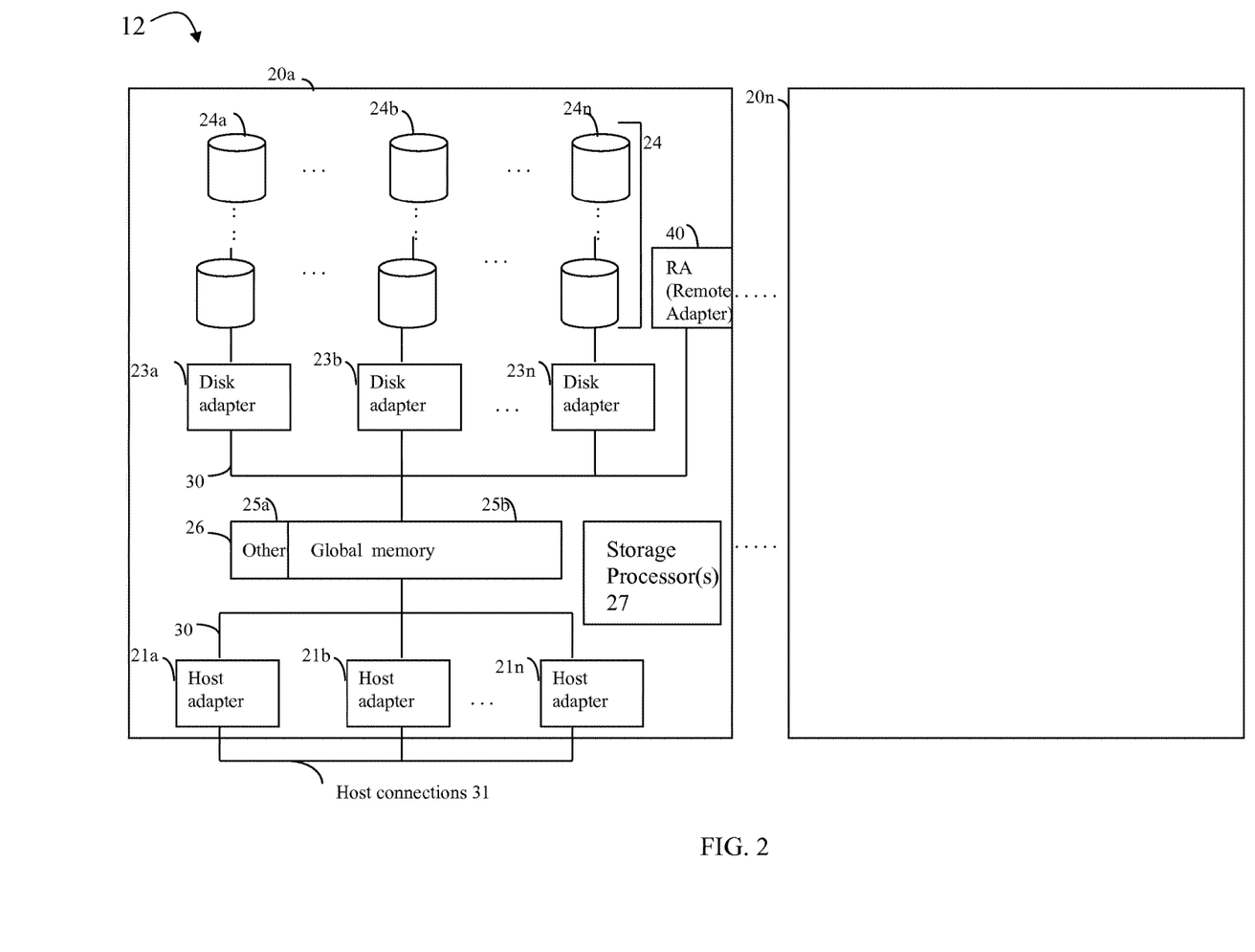

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, VNX™ data storage systems, such as the VNX8000™ data storage system, by EMC Corporation includes two storage processors (SPs). The system 20a may also include one or more host adapters ("HAs") or directors 21a-21n. Each of the HAs may be used to manage communications and data operations between one or more host systems and the global memory. In an embodiment, the HA may be a Fibre Channel Adapter or other front end adapter (FA) which facilitates host communication. The HA communicates with a component of the host such as a host bus adapter (HBA). Generally, directors may also be characterized as the different adapters, such as HAs (including FAs), DAs RAs, and the like, as described herein. RAs (remote adapters) are described in more detail below. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be noted that FIG. 2 generally illustrates components of the data storage system including multiple SPs 27, memory such as 25b, and the like.

The particular data storage system as described in this embodiment, or a particular data storage device thereof, such as a mechanical rotating disk or SSD (solid state storage device), should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

It should be noted that the data storage system may include multiple SPs in order to provide for redundancy whereby one of the SPs may be active or primary. In the event the active or primary SP fails or otherwise experiences a degradation thereby entering an unhealthy functional state, the other remaining SP may take over and function as the primary SP. In such a system, various suitable processing may be performed to ensure that each of the SPs has sufficient data and state information to assume the role of active or primary SP.

In connection with a data storage system, or more generally any system, problems or errors may occur. In a data storage system, such problems or errors may relate, for example, to a customer reported problem, a bug found in code executing on the data storage system (e.g., where such code may be provided by a data storage system vendor such as EMC Corporation), and the like. In connection with such a problem or bug, data collection may be performed to provide diagnostic information regarding the particular problem or bug that has occurred. Existing systems may perform needed data collection when manually triggered by a customer or user of the system. Such data collection may be performed, for example, when the customer or user perceives a problem with the system or when the customer may be instructed to trigger such data collection such as by a customer support personnel. As a result, the availability of diagnostic information included in such data collection regarding a reported problem is largely dependent on the timing of when the data collection is performed. Due to this, data collection may be performed in an untimely manner. Valuable diagnostic data may be lost, for example, if such data is stored in a memory, file, and the like, whose contents may be quickly overwritten or otherwise lost due to a system reboot, constraints due to size, and the like. Additionally, the data collected may generally be a very large amount making it difficult to store the necessary data and also adversely impacting system performance to collect such data.

To overcome drawbacks that may be associated with the foregoing, described in following paragraphs are techniques that perform automatic and customized data collection. Such data collection may be performed automatically in response to an occurrence of any one of a set of pre-defined events. Each of the events may be a particular data storage system event of interest for which data collection is desired. Such events may include, for example, events indicating problems or errors that have occurred in the customer's data storage system. Data may be automatically collected on the customer's data storage system in response to each event occurrence. The data collected may be customized for the particular event occurrence. Data collected from the customer's data storage system where the event occurs may include, for example, any one or more of log files, system configuration information, component traces, and runtime data.

Described in following paragraphs are techniques for performing automated data collection using a set of profiles, each of which may include a set of commands or instructions used to collect diagnostic data for a single specific event or a group of events. The group of events may be logically related, for example, to a specific component. Generally, in the context of a data storage system, a component may be any hardware or software entity of the data storage system used in servicing a client of the data storage system. As will be appreciated by those skilled in the art, use of profile-based data collection as described herein provides customized data collection for the particular event or component. Each of the predefined profiles may be associated with a single specific event or a group of events such as those related to a specific component. Such associations between events and profiles may be based on a predefined mapping. Profile-based data collection allows for collection of a reduced amount of customized diagnostic data in comparison to alternatively collecting a larger set of generic information. Additionally, such profile-based data collection may be automatically triggered in response to the occurrence of an event included in the set of predefined events. Thus, data collection may be launched immediately in response to detecting a system problem or error that corresponds to an occurrence of such an event.

Figure 3:
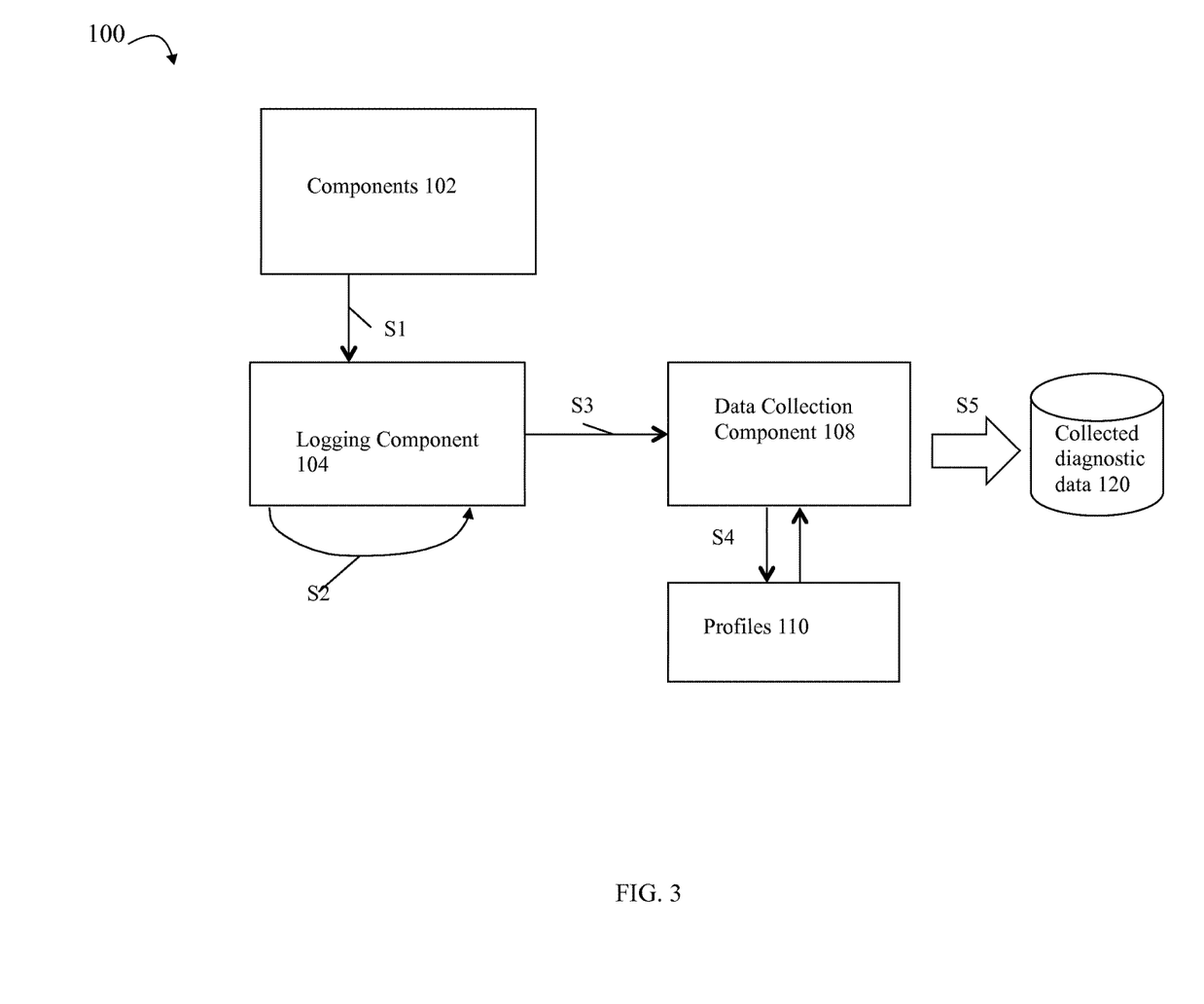
FIG. 3 is an example illustrating components and associated data flow that may be performed in an embodiment in accordance with techniques herein.

Referring to FIG. 3, shown is an example of components and associated data flow in an embodiment in accordance with techniques herein. The example 100 includes components 102, logging component 104, data collection component 108, profiles 110 and collected diagnostic data 120. As mentioned above, a component may be generally characterized as any hardware or software entity of the data storage system used in servicing a client of the data storage system. Components 102 may include those one or more components providing such a service to a client of the data storage system. Components 102 may include, for example, a software component running in the data storage system that performs a particular function such as servicing system I/Os (e.g., data path I/Os), data storage system management functionality, data replication, and the like. These exemplary components and others are described in more detail elsewhere herein.

A component of 102 may detect an occurrence of an event. The event may occur as a result of a particular operation or processing in connection with servicing a client request. The event occurrence may indicate a problem, error, and the like, in the system related to processing performed by, or on behalf of, the component. In a step S1, the component of 102 may report the event occurrence to the logging component 104. The logging component 104 may perform processing in a step S2 that includes mapping the particular event that has occurred to a profile for that event. The logging component may perform the mapping of step S2 using mapping information that identifies what profile is associated with each event of interest that may be reported. For example, a first component of 102 may service I/Os such as may be issued to read data from and/or write data to a LUN of the data storage system. An event may occur where the LUN enters an offline or unavailable state. The event occurrence may be reported by the first component of 102 to the logging component 104 which maps the event occurrence to a first profile. As described in more detail elsewhere herein, each of the profiles may be used to collect diagnostic data for a specific single event, or a group of related events, such as for a specific component. In this example, the first profile may be a profile for only that specific event. As a variation, the first profile may also be defined for a particular component, such as the first component noted above for servicing data path I/Os, and all event occurrences for that particular component may be mapped to the component-level profile. In step S2, the logging component may search a predefined mapping table (or more generally mapping information) for a profile that matches the LUN offline event that has occurred. In step S3, the logging component 104 may then invoke the data collection component 108 to perform data collection processing that collects diagnostic data for the LUN offline event occurrence. In one embodiment in step S3, the logging component 104 may identify (e.g., as an input to the data collection component 106 in step S3) the profile mapped to the event occurrence, such as the LUN offline event occurrence. In step S4, the data collection component 108 may retrieve the profile associated with the event occurrence. As illustrated in FIG. 3, the associated profile may be obtained from a data store of profiles 110 where the data store may include the set of predefined profiles mapped to events of interest via the mapping information. As part of step S4, the data collection component 108 may initiate execution of the commands identified in the profile associated with the event occurrence. In step S5, the diagnostic data collected 120 as a result of executing the associated profile may be stored in a target location. For example, the data collected 120 may be stored in a particular target location (e.g., device, directory, and the like) on the data storage system. Although not illustrated in the example 100, the collected data 120 may be further provided to another party, such as a customer support site, for analysis. Such analysis may be performed, for example, to determine a cause of a problem or error in the system as may be indicated by the event occurrence that triggered the automated collection of the diagnostic data 120.

The diagnostic data collected 120 may include any of log files, system configuration information, component traces, and runtime data. The log files may include, for example, a system log file where system-wide events and occurrences may be logged. The component traces may include commands and/or events recorded with respect to a particular hardware or software component of the data storage system. For example, tracing may provide a sequential list of commands or operations performed with respect to a component and may include associated results or state information for performing such commands or operations with respect to the particular component. For example, tracing with respect to the global data cache may include a number of operations or commands performed which use the cache and various resulting state information about the cache. As another example, tracing with respect to execution of a software module or process may follow the path of runtime execution perhaps with respect to a particular input data set to provide a better insight into how such code executes and interacts with its environment. Generally, tracing may provide for tracking information about a component to pinpoint locations or points in time at which the component deviates from its expected behavior or state.

The system configuration information may relate to one or more aspects regarding the current configuration of the data storage system. Such configuration information may include, for example, information regarding physical and logical entities in a current data storage system configuration. For example, configuration data may include information regarding existing logical entities such as RAID groups, LUNs, storage groups of one or more LUNs, and the like. Configuration data may include information regarding existing physical entities such as, for example, physical storage devices, physical components such as DAs, HAs, fans, power supplies, and the like. Such configuration information may include attributes or properties describing details about such physical and logical entities in the system. For example, a logical entity such as a RAID group may be represented in the configuration data by an object having attributes such as indicating a RAID level of the RAID group (e.g., RAID-0, 1, 5, or 6), a number of data and/or parity drives, identify the particular physical storage device instances used in the RAID group configuration, and the like. For a logical entity such as a LUN, the configuration data may include an object representing that LUN along with attributes about the LUN such as the RAID group providing the physical storage provisioned for the LUN, the LUN size or logical address range capacity, and the like. For a physical entity such as a physical storage device, the configuration data may include an object representing that physical device along with attributes identifying the physical storage capacity of the device, a type of physical device (e.g., whether the physical device is a disk or flash-based storage technology), and the like.

The runtime data may include current runtime state information at the time of event occurrence. Such runtime data may include, for example, the current contents of memory, registers, parameter or system settings, and the like, at the time of the event occurrence.

Figure 3A:
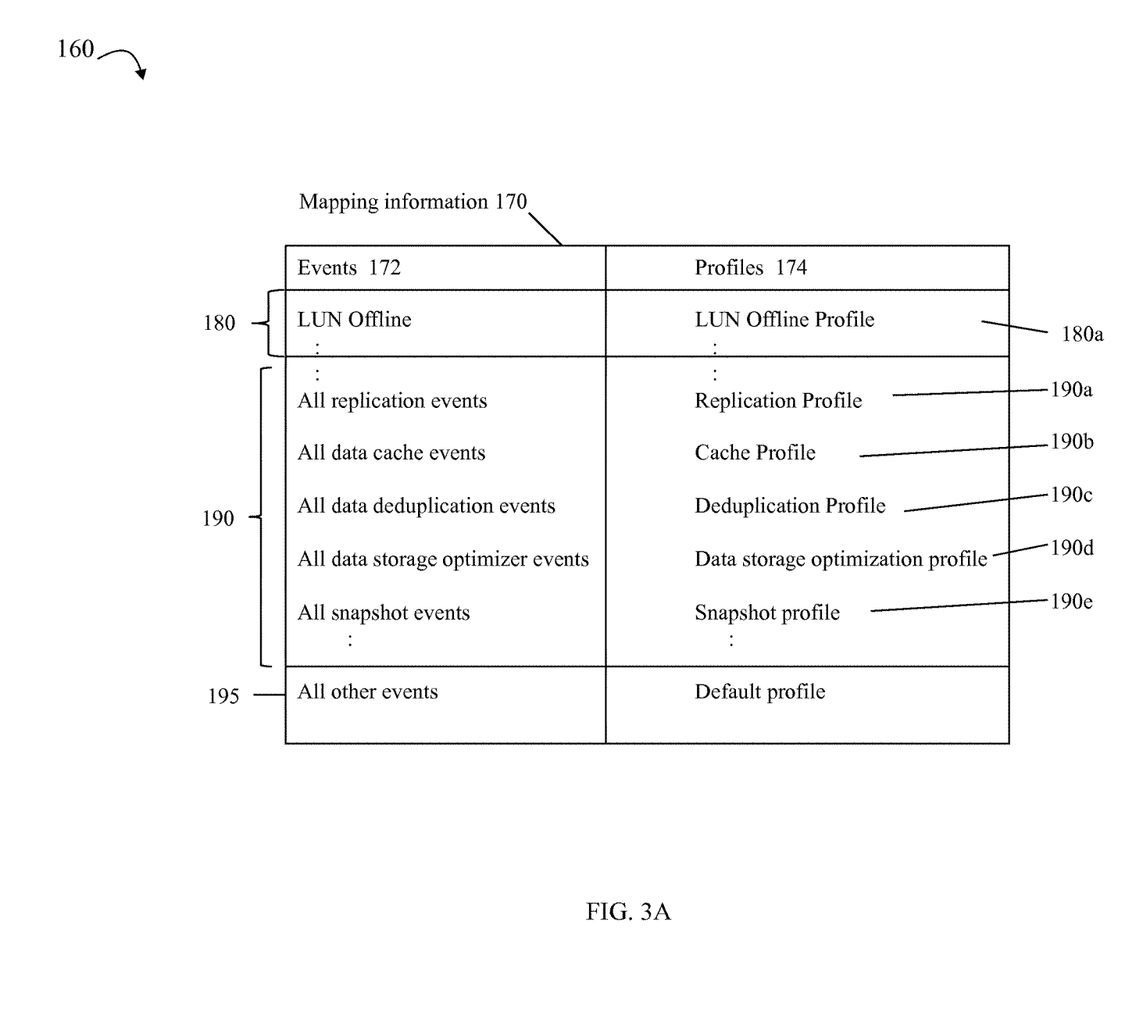
FIG. 3A is an example of mapping information that may be used in an embodiment in accordance with techniques herein.

Referring to FIG. 3A, shown is an example 160 illustrating mapping information that may be used in an embodiment in accordance with techniques herein. Element 170 is a table of mapping information. It should be noted that although the mapping information is shown in tabular form in the example 160, more generally, the mapping information may be incorporated into any suitable form and format for use in an embodiment in accordance with techniques herein. The table mapping information 170 may include a first column of events 172 and second column of profiles 174. Each row of the table 170 identifies one or more events (as specified in column 172 of that row) and an associated profile (as specified in column 174 of that row) mapped to the one or more events. As described elsewhere herein, the mapping information 170 may be used by the logging component to map an event that has occurred to its associated profile.

Element 180 may generally represent one or more entries of the mapping information table identifying event-profile mappings where each such profile in 180 may be specified for a specific single event. For example, row 180a may specify the mapping information used in connection with determining an event specific profile used in performing data collection upon the occurrence of the LUN offline event as described above in connection with FIG. 3. The LUN offline profile may include commands and other information used in performing data collection for the single LUN offline event.

Element 190 may generally represent one or more entries of the mapping information table identifying event-profile mappings where each such profile in 190 may be specified for a group of related multiple events, such as event occurrence related to a specific component. For example, row 190a may specify the mapping information used in connection with determining the component specific profile, the replication profile, used in performing data collection upon the occurrence of any replication event. A data replication component may perform processing to replicate or copy data. For example, in one embodiment, the data replication component may include RDF (Remote Data Facility) by EMC Corporation which performs automated remote replication of data, such as data of one or more LUNs, from a first data storage system to a second data storage system. With RDF, a host may issue a command, such as to write data to device R1 of data storage system. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the Remote Data Facility (RDF) product provided by EMC Corporation of Hopkinton, Mass. Data storage device communication between Symmetrix® data storage systems using RDF is described, for example, in U.S. Pat. Nos. 5,742,792 and 5,544,347, both of which are incorporated by reference herein. With RDF, a user may denote a first local storage device, such as R1 and a second remote storage device, such as R2. The host may interact directly with the device R1 of a first data storage system where any data changes made to R1 are automatically provided to the R2 device of a second remote data storage system using RDF. In operation, the host may read and write data using the R1 volume, and RDF may handle the automatic copying and updating of data from R1 to R2 in the second data storage system. In this example with reference to 190a, any event occurrence related to replication event, such as an event that occurs as a result of processing performed by RDF, is mapped via 190*a* to the replication profile. Such replication-related event occurrence may include, for example, a failure to replicate data from an R1 to an R2 device, a network connection to an R2 device being down, and the like. The replication profile may include commands and other information used in performing data collection for data replication-related events.

Row 190*b* may specify the mapping information used in connection with determining the component specific profile used in performing data collection upon the occurrence of any data cache event. In one embodiment, the data cache, also be referred to as a global data cache, may be characterized as a data cache accessible to, and used by, components of the data storage system such as DAs, FA, RAs, and the like. The global data cache may be used, for example, in storing data read from, and data to be written to, physical storage devices. For a read operation, a read request may result in either a cache hit (e.g., read hit) or a cache miss (read miss). With a cache hit, the requested read data is already located in cache and is simply retrieved from the cache and returned to the requesting client. With a cache miss, the requested read data is not found in cache. In order to service the read request when the data is not currently in cache, the requested read data is retrieved from the physical storage device, stored in cache, and then provided to the requesting client, such as a host. In connection with write requests, a data storage system in an embodiment in accordance with techniques herein may implement write-back caching. When a write request is received, the data to be written may be stored in cache and marked as write pending. At a later point in time, the write pending data may be destaged whereby such data is written out from the cache to the physical storage device. It should be noted that the cache may already contain an entry corresponding to the write operation location. For example, the write operation may indicate to write data to a particular LUN and LBA (logical block address) on that LUN, such as LUN X, LBA Y. At the time the write operation is received, there may already be an existing write pending entry in the cache for LUN X, LBA Y. In this case, the received write operation data may be stored in the existing cache entry with the new write data. Alternatively, if there is no existing write pending entry in the cache for LUN A, LBA Y, a cache entry may be allocated for storing the write operation data. Thus, the global data cache is an example of a component for which multiple different events may occur at various points in time. In this example with reference to 190*b*, any event occurrence related to the global data cache, such as a caching-related event that occurs as a result of processing placing data in the data cache, is mapped via 190*b* to the cache profile. Such caching related event occurrences may include, for example, a maximum allowable or threshold amount of the data cache being used, a threshold amount of the cache being used in connection with storing pending write operation data, and the like. The cache profile may include commands and other information used in performing data collection for data cache-related events.

Row 190*c* may specify the mapping information used in connection with determining the component specific profile used in performing data collection upon the occurrence of any data deduplication event. In one embodiment, the data deduplication component may performs data deduplication to identify and eliminate redundant copies of data portions and store a single copy of such data which may be accordingly referenced. In this example with reference to 190*c*, any event occurrence related to data deduplication is mapped via 190*c* to the deduplication profile. The deduplication profile may include commands and other information used in performing data collection for data deduplication-related events.

Row 190*d* may specify the mapping information used in connection with determining the component specific profile used in performing data collection upon the occurrence of any data storage optimizer event. In one embodiment, the data storage optimizer component may perform different data storage optimization in efforts to improve data storage system performance. For example, the data storage optimizer component may be a data storage optimizer such as the FAST™ (Fully Automated Storage Tiering) product by EMC Corporation of Hopkinton, Mass. Such a data storage optimizer may optimize use of different storage tiers in a data storage system and may apply tiering policies (e.g., allocation policies, data movement policies including promotion and demotion thresholds, and the like) to transparently automate the control, placement, and movement of data within different storage tiers of a storage system based on business needs. In this example with reference to 190*d*, any event occurrence related to the data storage optimizer component is mapped via 190*d* to the data storage optimization profile. The data storage optimized profile may include commands and other information used in performing data collection for data storage optimizer-related events.

Row 190*e* may specify the mapping information used in connection with determining the component specific profile used in performing data collection upon the occurrence of any snapshot event. In one embodiment, the snapshot component may include functionality for creating any one or more different types of snapshots (e.g. snapshots of different entities of varying levels of granularity). For example, a snapshot component may provide for creating any one or more of a LUN-level snapshot, a file system snapshot, a snapshot of one or more files or directors, and the like. As known in the art, a snapshot may be characterized as a logical point in time copy of data. Multiple snapshots of an entity may be created with respect to a single physical copy of data. In other words, as known in the art, each snapshot of an entity, such as a LUN, may not be a complete bit for bit copy or replication of the LUN. Rather, a snapshot may be logically constructed with respect to a base or physical data set. For example, in one embodiment the snapshot component may include the SnapView™ application provided by EMC Corporation which may be used to create point in time snapshot of production data for nondisruptive backup. A snapshot may be made with respect to a source LUN thereby providing a point in time image of the source LUN. A snapshot may appear like a normal LUN and may be used for backup, testing, and the like. Snapshots may rely, for example, on copy on first write (COFW) and other techniques to track source LUN changes from the time when a snapshot was created. Any writes to the source LUN may result in processing by snapshot software to copy the original data prior to changes into another area of storage. With respect to COFW techniques, the COFW occurs only once for each data block modified on the source LUN. Since only changed data blocks of the source LUN are retained rather than make a complete copy of the source LUN, the storage capacity required to implement snapshots may be considerably less than that of the source LUN. A snapshot of a LUN is a virtual point in time copy and requires access to the unchanged data in the source LUN. Therefore failures affecting the source LUN also affect the snapshot of the LUN. Snapshots of a LUN may be contrasted, for example, with bit-for-bit replica data copies of a source LUN. In this example with reference to 190*e*, any event occurrence related to the snapshot component is mapped via 190e to the snapshot profile. The snapshot profile may include commands and other information used in performing data collection for snapshot-related events.

Element 195 may generally represent a default event-profile mapping entry of the mapping information table. The entry 195 may be used as a default, for example, if, for a particular event occurrence, no other entry of 170 identifies an event in column 172 that matches the particular event occurrence. In this example with reference to 195, any such event occurrence that does not match any entry in column 172 is mapped via 195 to the default profile. The default profile may include commands and other information used in performing default data collection processing that may also be characterized as generic.

Consistent with description elsewhere herein, upon an event occurrence, the logging component may map the particular event that has occurred to a profile. In one embodiment, processing may include first determining whether there exists a particular event-specific profile mapped to the event that has occurred. If so, that event-specific profile may be used for data collection. If not, processing may then include determining whether there exists a component level profile related mapped to the event that has occurred. If so, that component-specific profile may be used for data collection. If not, then a default or generic profile such as identified by 195 may be used for data collection.

Figure 4:
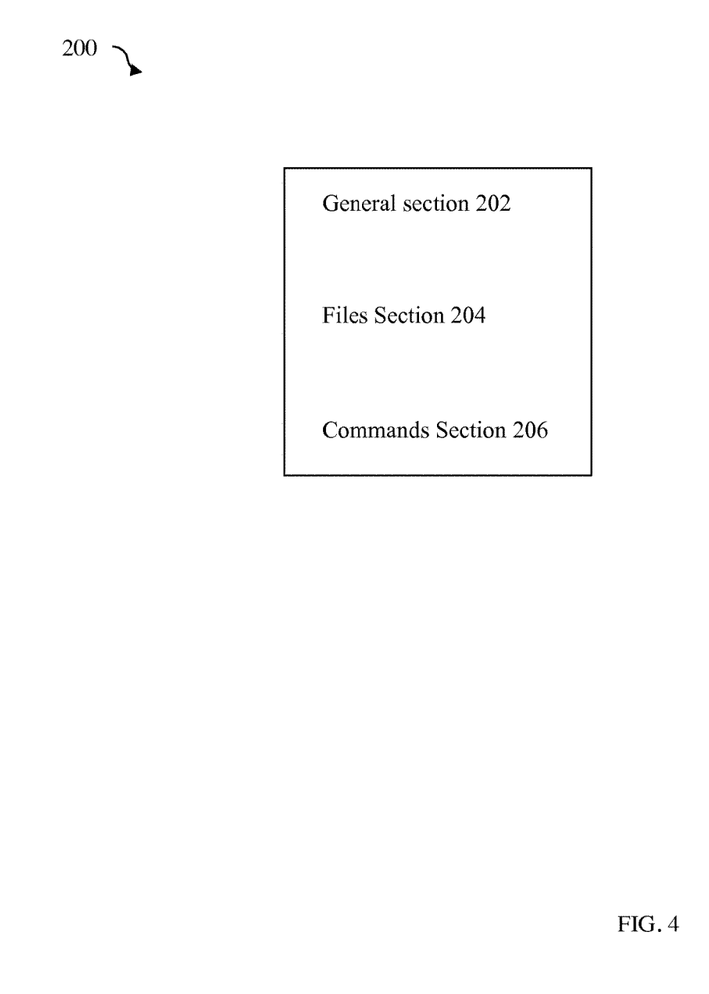
FIGS. 4, 5, 6, and 7 are examples illustrating profiles that may be used in an embodiment in accordance with techniques herein.

Referring to FIG. 4, shown is an example of information that may be included in each profile defined for use in an embodiment in accordance with techniques herein. Each profile may include a general section 202, a files section 204 and a commands section 206. A profile may also optionally include additional sections and other information than as illustrated herein. The general section 202 may include general information for this profile such as, for example, the profile name or description of the event or component associated with the profile. The general section 202 may also identify one or more thresholds or other constraints applied in connection with performing data collection in accordance with the profile.

The files section 204 may identify the files (e.g., of the customer's data storage system) which are collected as part of the data collection processing performed with this profile. Generally, section 204 identifies the particular one or more files including data of interest for a particular event associated with the profile. The files identified in 204 may include, for example, any of a system log file, a system configuration file, a component trace, and a file including runtime data. The foregoing types of data and information are described elsewhere herein.

The commands section 206 may include one or more commands which are executed to perform the data collection process for this particular profile (e.g., to collect the desired event data customized for the associate event(s)). The commands section 206 may also identify a script which includes one or more command, conditional processing steps, and the like, performed in connection with data collection processing for the profile. Thus, the commands sections 206 may include commands directly inline in the profile, and/or may otherwise identify an external file, such as a script, which includes commands that are executed for data collection (e.g., when an event has occurred where the event is associated with the profile including the script in the profile's command section). For example, the commands executed (e.g., either inline or as part of a script) may include commands that copy particular log files or system configuration files, or portions thereof, (e.g., where such files may be identified in section 204) to a particular target location or target data set. The target location or target data set may then include the collected customized data which may be used to analyze a problem denoted by the event occurrence. The commands may include a command that obtains current runtime values, such as indicating a current state of the system and may vary with the particular system. For example, in a system including a Windows-based operating system, a command may obtain current values of one or more registry keys or other system-wide variables or settings. In a system including a Unix-based operating system, a command may obtain a current value for system-wide variables or settings such as a global error state (e.g., as may be indicated by the global variable "errno" known in the art). The commands may include a command that obtains current runtime values from memory, registers, and the like (e.g., using commands such as PEEK and/or POKE). The commands may, for example, invoke other external programs, utilities, code modules, software tools, and the like, such as in connection with processing any one or more files that may be identified in the files section 204.

It should be noted that additional detail and examples of profiles and sections thereof are provided in subsequent figures and paragraphs.

Figure 5:
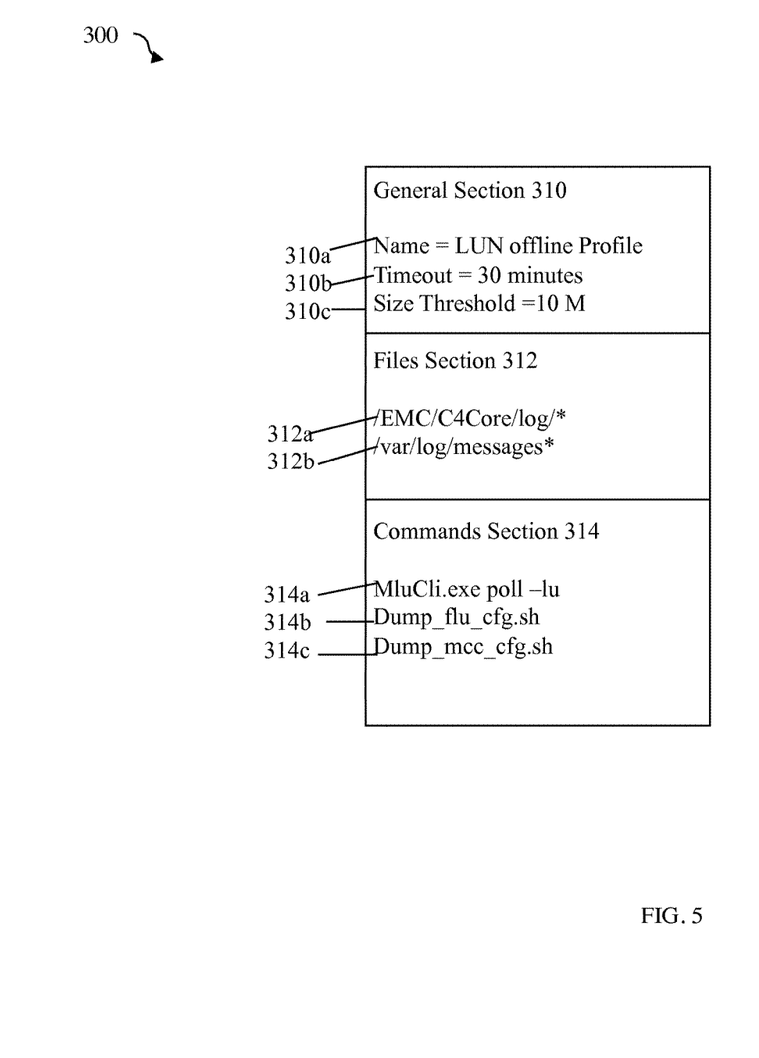

Referring to FIG. 5, shown is a first example of information that may be included in a first profile in an embodiment in accordance with techniques herein. The example 300 illustrates information that may be included in the LUN offline profile mapped to the LUN offline event as described elsewhere herein. The LUN offline profile illustrated in the example 300 may include general section 310, files section 312 and commands section 314.

The general section 310 may include line 310a identifying the name of the profile and/or event associated with the profile. Section 310 may also identify data collection constraints in lines 310b, 310c. In line 310b, a timeout control parameter specifies a threshold or maximum allowable amount of time that processing may be performed for data collection in connection with this profile. For example, the 30 minute time limit may indicate a maximum amount of time that may elapse once execution of the commands section has commenced. Line 310c specifies a size limit or threshold regarding a maximum allowable amount of data that may be collected in the aggregate as a result of executing commands of this profile. In this example, line 310c indicates a maximum amount of 10 megabytes of data may be collected during the data collection process by this profile.

The files section 312 may include line 312a identifying a first set of directories and files that may contain information, for example, related to LUN state and configuration information, and trace information regarding LUNs and associated states, events, and the like, at various points in time. Line 312b may identify a second set of directories and files containing system level events logged (e.g., operating system level events logged such as network down, system reboot).

The commands section 314 may identify all commands, scripts, and the like, executed for this profile. As mentioned above, section 314 may include commands inline or in another file, such as a script identified in 314. In this example, the commands section 314 may include line 314a which may be an inline command executed to obtain current runtime information of the LUN properties and configuration at the time of the event occurrence. Lines 314b-c may each identify a script executed to dump status information from other components that the LUN may have dependencies upon, or which may be dependent upon the LUN. For example, the LUN may be configured from storage of a RAID group and physical storages of the RAID group. Additionally, the LUN may have pending write data or other data stored in the global data cache. In this case, the scripts of 314b-c may include commands to obtain and/or check the status of such one or more other dependent components (e.g., RAID group, physical storage devices, cache).

Figure 6:
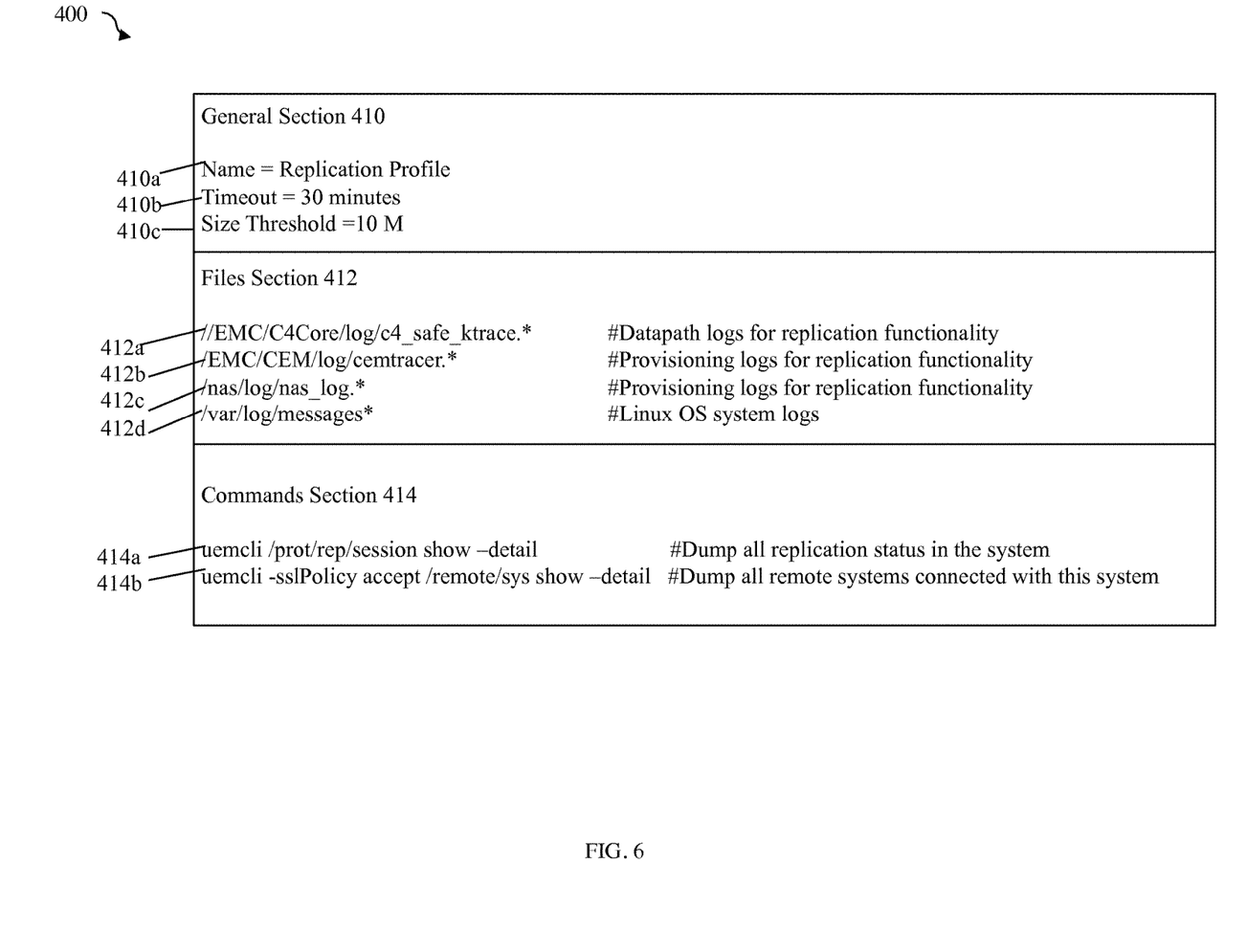

Referring to FIG. 6, shown is a second example of information that may be included in a second profile in an embodiment in accordance with techniques herein. The example 400 illustrates information that may be included in the replication profile mapped to the replication-related events as described elsewhere herein. The replication profile illustrated in the example 400 may include general section 410, files section 412 and commands section 414.

The general section 410 may include line 410a identifying the name of the profile and/or event associated with the profile. Section 410 may also identify data collection constraints in lines 410b, 410c. In line 410b, a timeout control parameter specifies a threshold or maximum allowable amount of time that processing may be performed for data collection in connection with this profile. For example, the 30 minute time limit may indicate a maximum amount of time that may elapse once execution of the commands section has commenced. Line 410c specifies a size limit or threshold regarding a maximum allowable amount of data that may be collected in the aggregate as a result of executing commands of this profile. In this example, line 410c indicates a maximum amount of 10 megabytes of data may be collected during the data collection process by this profile.

The files section 412 may include line 412a identifying a first set of directories and files that may contain information, for example, related to the data path I/O logs for replication. Lines 412b and 412c may identify data storage provisioning logs collected for replication. Line 412d may include operating system level logs collected.

The commands section 414 may identify all commands, scripts, and the like, executed for this profile. As mentioned above, section 314 may include commands inline or in another file, such as a script identified in 414. In this example, the commands section 414 may include line 414a which may be an inline command executed to obtain detailed replication status information. Line 414b may be an inline command executed to obtain information regarding all remote data storage systems connected to the data storage system in which the triggering event occurred (e.g., causing data collection and execution of this profile).

Figure 7:
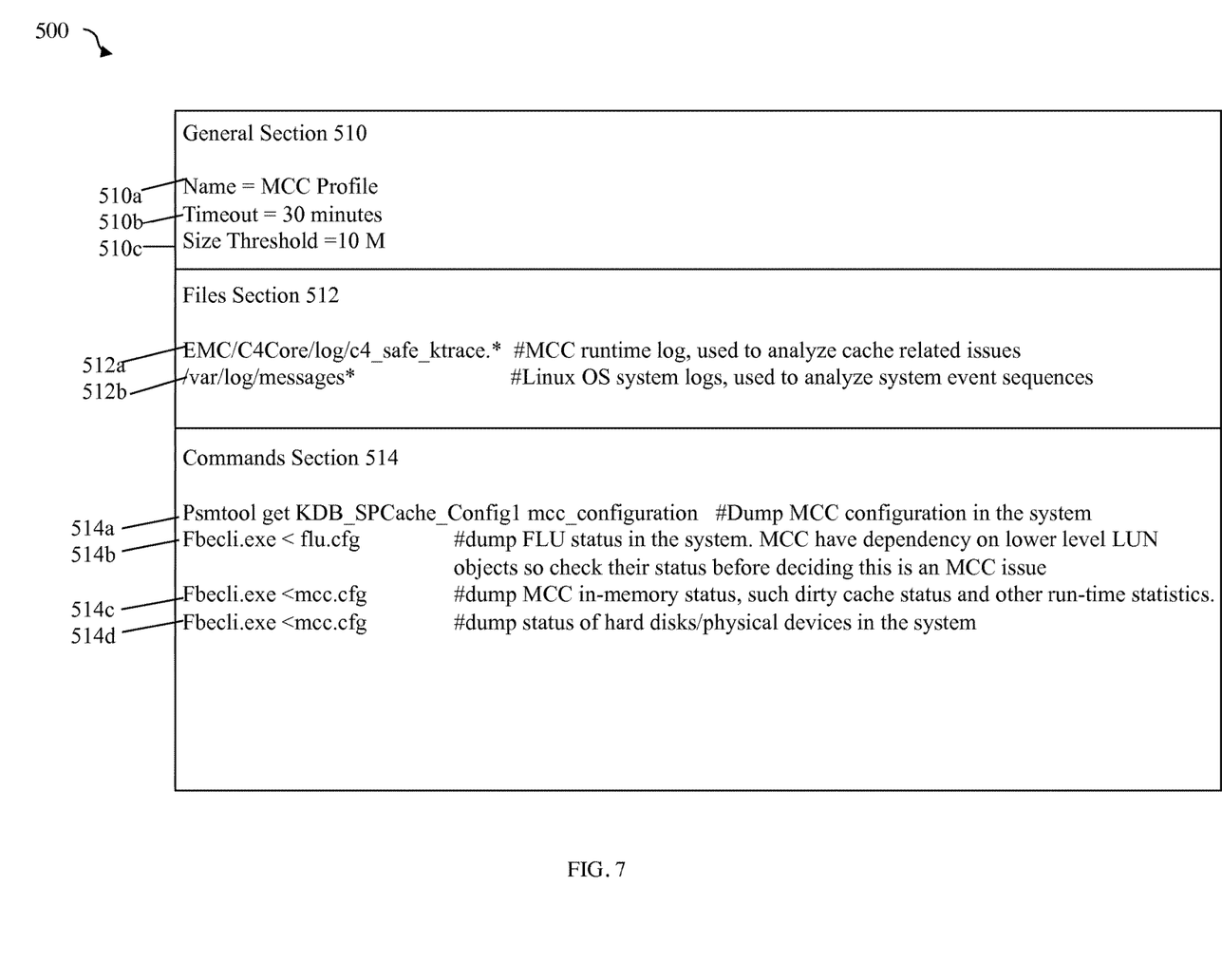

Referring to FIG. 7, shown is a third example of information that may be included in a third profile in an embodiment in accordance with techniques herein. The example 500 illustrates information that may be included in the cache profile mapped to the data cache-related events as described elsewhere herein. The cache profile illustrated in the example 500 may include general section 510, files section 512 and commands section 514.

The general section 510 may include line 510a identifying the name of the profile and/or event associated with the profile. Section 510 may also identify data collection constraints in lines 510b, 510c. In line 510b, a timeout control parameter specifies a threshold or maximum allowable amount of time that processing may be performed for data collection in connection with this profile. For example, the 30 minute time limit may indicate a maximum amount of time that may elapse once execution of the commands section has commenced. Line 510c specifies a size limit or threshold regarding a maximum allowable amount of data that may be collected in the aggregate as a result of executing commands of this profile. In this example, line 510c indicates a maximum amount of 10 megabytes of data may be collected during the data collection process by this profile.

The files section 512 may include line 312a identifying a first set of directories and files that are the caching runtime log files that may be used to analyze cache-related problems and events. Line 512b may identify a second set of directories and files containing system level events logged (e.g., network down, system reboot).

The commands section 514 may identify all commands, scripts, and the like, executed for this profile. As mentioned above, section 514 may include commands inline or in another file, such as a script identified in 514. In this example, the commands section 514 may include line 514a which may be an inline command invoking a tool to obtain current data cache configuration information (e.g., size of the read/write data cache, particular policies in effect such as how to age cache entries, cache eviction policy, and the like). Line 514b may be a command that invokes a tool to obtain LUN status information since there is a dependency between LUNs and the data cache (e.g., LUNs have their write pending data and read data stored in the data cache). Thus, line 514b may be executed to obtain such LUN state information. Line 514c may be a command that invokes a tool to obtain cache-related status information (e.g., content and status of data cache, a current read cache hit rate, a current read cache miss rate, ratio of read cache hits to read cache misses, amount or percentage of cache that is free, used for storing pending writes, and the like). Line 514d may be a command that invokes a tool to obtain status information of physical storage devices in the system (e.g., amount of physical storage capacity consumed/available, health of the physical devices).

Described above are techniques that may be performed for profile-based data collection whereby the amount of data collected may be reduced and the collected data may be characterized as customized for the particular event occurrence. As described above, each profile may be associated with one or more events and may identify the files to be collected during the data collection process as well as a list of commands, scripts, etc. to be run to perform the data collection. The data collection process described herein is triggered automatically by the occurrence of events of interest. The data collection processing may be performed on the customer data storage system based on the profile for the event occurrence. The data collected may be bundled together and stored on a target location on the customer site or system. The collected data bundle may then be uploaded or pushed to a customer support center. All of the foregoing may be performed automatically using commands included in the profile or commands otherwise specified using the profile (e.g., such commands may be included in a script invoked through the profile).

Figure 8:
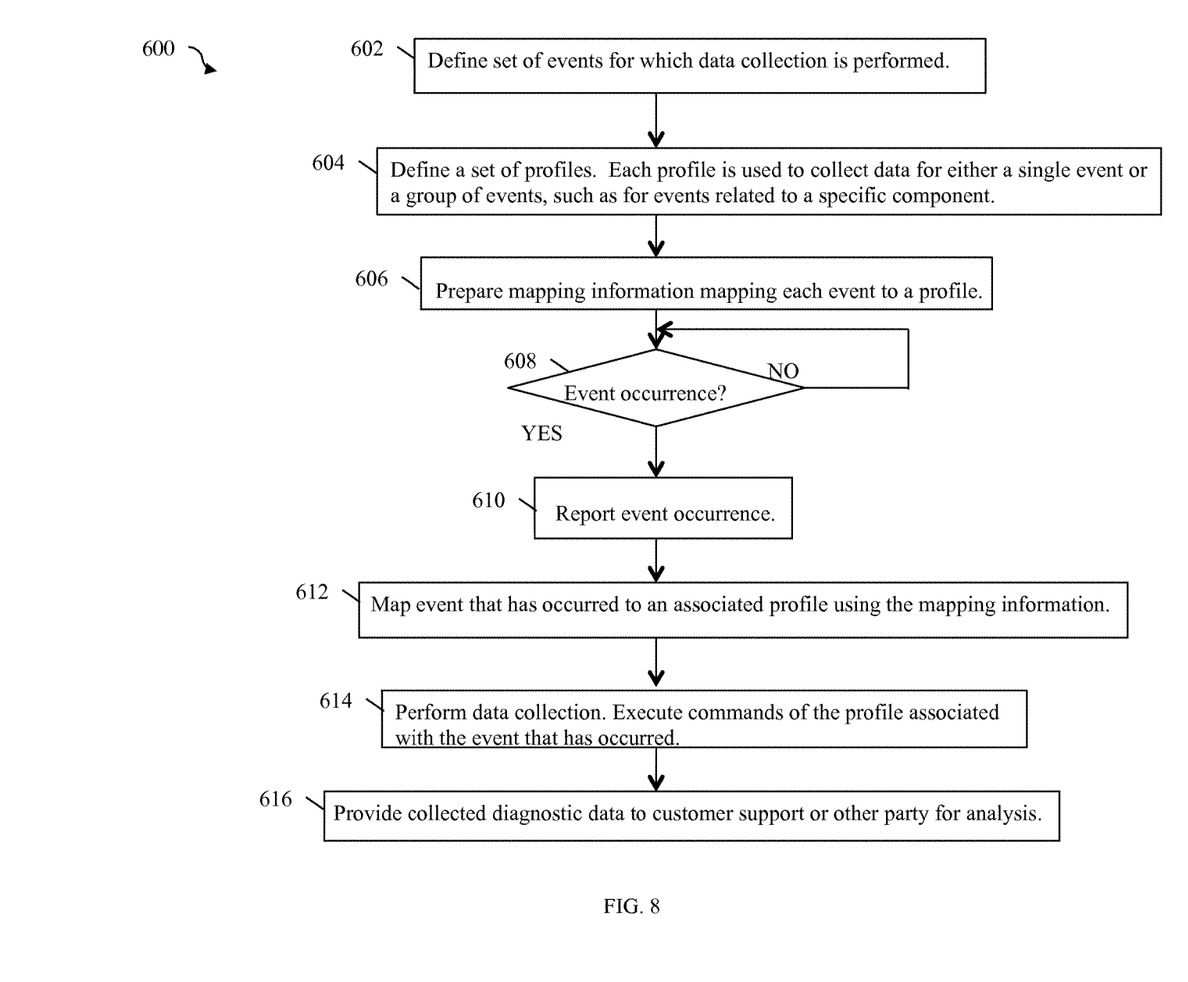
FIG. 8 is a flowchart of processing steps that may be performed in an embodiment in accordance with techniques herein.

Referring to FIG. 8, shown is a flowchart of processing steps that may be performed in an embodiment in accordance with techniques herein. The flowchart 600 summarizes processing as described above. In step 602, a set of events may be defined for which data collection is performed. In step 604, a set of profiles may be defined. Each profile may be used to collect data for either a single event or a group of events, such as for events related to a specific component. In step 606, mapping information may be prepared that maps each event (such as identified in step 602)

to a profile (from step 604). It should be noted that, as described herein, an embodiment may also include a default profile that may be used for data collection if an event should occur which is not otherwise mapped to an event-specific profile or a component-specific profile. Thus, a default profile may be triggered for data collection upon the occurrence of an event which is not otherwise mapped to a profile in accordance with the mapping information. At step 608, processing is performed to wait for the occurrence of an event. Once step 608 evaluates to yes, control proceeds to step 610 to report the event occurrence, such as to the logging component described herein. At step 612, processing is performed, such as by the logging component, to map the event that has occurred to an associated profile using the mapping information. At step 614, data collection is performed. Step 614 may include executing the command identified in the profile associated with the event that has occurred. At step 616, the collected data, which includes diagnostic data regarding the event occurrence, may be provided to customer support or another party/site for analysis.

An embodiment may implement the techniques herein using code executed by a processor. For example, an embodiment may implement the techniques herein using code which is executed by a processor of a system, such as the data storage system, management system, or more generally, any computer system, chip or component including a processor, and the like. As will be appreciated by those skilled in the art, the code may be stored on the data storage system on a computer-readable storage medium (also referred to as a computer readable medium) having any one of a variety of different forms including volatile and non-volatile, removable and non-removable media implemented in any method or technology for storage of information such as computer readable instructions, data structures, program modules or other data. Computer-readable storage media (or computer readable media) includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for processing event occurrences comprising:
    receiving a first notification regarding a first occurrence of a first event; and
    responsive to receiving the first notification, performing first processing including:
        mapping, by a logging component using mapping information, the first event to a first profile of a plurality of predefined profiles, wherein the mapping information identifies event-profile mappings and includes a table of information with a first column of events mapped to corresponding profiles for data collection that are included in a second column of the table; and
        invoking, by the logging component, a data collection component, wherein the logging component provides the first profile as an input to the data collection component that performs second processing using the first profile to collect first data regarding the first occurrence of the first event, wherein the plurality of predefined profiles includes a data storage optimization profile, a replication profile and a cache profile, wherein the mapping information maps events regarding a data storage optimizer automating placement and movement of data within different storage tiers of a storage system to the data storage optimization profile that includes commands executed to collect information responsive to an occurrence of a data storage optimizer related event, maps data replication events regarding remote replication of data between different data storage systems to the replication profile that includes commands executed to obtain information responsive to an occurrence of a data replication event regarding remote replication, and maps data cache events to the cache profile that includes one or more commands that are executed to obtain current data cache configuration information and cache-related status information responsive to an occurrence of a data cache event.

2. The method of claim 1, wherein said mapping further includes:
    selecting the first profile from the plurality of predefined profiles included in the second column of the table, wherein each of said plurality of predefined profiles is mapped by the mapping information to any of a single event and a logical grouping of multiple events.

3. The method of claim 2, wherein the plurality of predefined profiles includes at least one profile mapped by the mapping information to a defined logical grouping of multiple events and at least one profile mapped to a single event.

4. The method of claim 2, wherein the first profile includes a first section of general information, the first section comprising one or more thresholds specifying constraints enforced when performing second processing using the first profile to collect the first data.

5. The method of claim 4, wherein the one or more thresholds include a time threshold identifying a maximum allowable amount of time to perform said second processing to collect the first data.

6. The method of claim 4, wherein the one or more thresholds include a size threshold identifying a maximum allowable size of the first data collected, as a result of performing said second processing, about the first occurrence of the first event identified by the first notification.

7. The method of claim 4, wherein the first profile includes a second section identifying one or more files included in the first data collected, said one or more files including any of a system log file, a system configuration file, a component trace, and runtime data.

8. The method of claim 7, wherein the first profile includes a third section identifying one or more commands executed in said second processing to collect the first data.

9. The method of claim 8, wherein the third section includes a first command inline in the first profile and wherein the third section also identifies a script including one or more additional commands, said first command and the script being executed in said second processing to collect the first data.

10. The method of claim 3, wherein the at least one profile mapped to multiple events is for a data storage system component.

11. The method of claim 1, wherein the plurality of predefined profiles includes, a snapshot profile, and a data deduplication profile, and wherein the mapping information maps events regarding a snapshot facility to the snapshot profile, and maps events regarding a data deduplication facility to the data deduplication profile.

12. The method of claim 1, wherein the first profile identifies one or more commands executed in the second processing that perform customized data collection for the first event.

13. The method of claim 1, wherein the method is performed in a data storage system for data storage system related events and the first data includes diagnostic information related to any of a system log file, data storage system configuration information, a component trace, and runtime data.

14. A non-transitory computer readable medium comprising code stored thereon that, when executed, performs a method that processes event occurrences comprising:
receiving a first notification regarding a first occurrence of a first event; and
responsive to receiving the first notification, performing first processing including:
mapping, by a logging component using mapping information, the first event to a first profile of a plurality of predefined profiles, wherein the mapping information identifies event-profile mappings and includes a table of information with a first column of events mapped to corresponding profiles for data collection that are included in a second column of the table; and
invoking, by the logging component, a data collection component, wherein the logging component provides the first profile as an input to the data collection component that performs second processing using the first profile to collect first data regarding the first occurrence of the first event, wherein the plurality of predefined profiles includes a data storage optimization profile, a replication profile and a cache profile, wherein the mapping information maps events regarding a data storage optimizer automating placement and movement of data within different storage tiers of a storage system to the data storage optimization profile that includes commands executed to collect information responsive to an occurrence of a data storage optimizer related event, maps data replication events regarding remote replication of data between different data storage systems to the replication profile that includes commands executed to obtain information responsive to an occurrence of a data replication event regarding remote replication, and maps data cache events to the cache profile that includes one or more commands that are executed to obtain current data cache configuration information and cache-related status information responsive to an occurrence of a data cache event.

15. The non-transitory computer readable medium of claim 14, wherein said mapping further includes:
selecting the first profile from the plurality of predefined profiles, wherein each of said plurality of predefined profiles is mapped to any of a single event and a logical grouping of multiple events.

16. The non-transitory computer readable medium of claim 15, wherein the plurality of predefined profiles includes at least one profile mapped to a defined logical grouping of multiple events and at least one profile mapped to a single event.

17. The non-transitory computer readable medium of claim 15, wherein the first profile includes a first section of general information, the first section comprising one or more thresholds specifying constraints enforced when performing second processing using the first profile to collect the first data.

18. The non-transitory computer readable medium of claim 17, wherein the first profile includes a second section identifying one or more files included in the first data collected, said one or more files including any of a system log file, a system configuration file, a component trace, and runtime data.

19. The non-transitory computer readable medium of claim 17, wherein the first profile includes a third section identifying one or more commands executed in said second processing to collect the first data.

20. A data storage system comprising:
one or more processors; and
a memory comprising code stored therein that, when executed by a first of said one or more processors, performs a method that processes event occurrences in the data storage system, the method comprising:
receiving a first notification regarding a first occurrence of a first event; and
responsive to receiving the first notification, performing first processing including:
mapping, by a logging component using mapping information, the first event to a first profile of a plurality of predefined profiles, wherein the mapping information identifies event-profile mappings and includes a table of information with a first column of events mapped to corresponding profiles for data collection that are included in a second column of the table; and
invoking, by the logging component, a data collection component, wherein the logging component provides the first profile as an input to the data collection component that performs second processing using the first profile to collect first data regarding the first occurrence of the first event, wherein the plurality of predefined profiles includes a data storage optimization profile, a replication profile and a cache profile, wherein the mapping information maps events regarding a data storage optimizer automating placement and movement of data within different storage tiers of a storage system to the data storage optimization profile that includes commands executed to collect information responsive to an occurrence of a data storage optimizer related event, maps data replication events regarding remote replication of data between different data storage systems to the replication profile that includes commands executed to obtain information responsive to an occurrence of a data replication event regarding remote replication, and maps data cache events to the cache profile that includes one or more commands that are executed to obtain current data cache configuration information and cache-related status information responsive to an occurrence of a data cache event.

* * * * *